US009591069B2

(12) United States Patent
Thornburgh et al.

(10) Patent No.: US 9,591,069 B2
(45) Date of Patent: Mar. 7, 2017

(54) PEER-TO-PEER ASSIST FOR LIVE MEDIA STREAMING

(75) Inventors: Michael Thornburgh, San Jose, CA (US); Srinivas Manapragada, Fremont, CA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 666 days.

(21) Appl. No.: 13/285,904

(22) Filed: Oct. 31, 2011

(65) Prior Publication Data

US 2013/0110981 A1 May 2, 2013

(51) Int. Cl.
*G06F 15/16* (2006.01)
*H04L 29/08* (2006.01)
*H04L 29/06* (2006.01)

(52) U.S. Cl.
CPC .......... *H04L 67/1046* (2013.01); *G06F 15/16* (2013.01); *H04L 65/4084* (2013.01); *H04L 67/1078* (2013.01)

(58) Field of Classification Search
CPC ... H04L 69/24; H04L 67/1051; H04L 67/104; H04L 12/24; H04L 12/66; H04L 41/30; H04L 29/06; H04L 67/1078; H04L 65/4084; H04L 67/1046; H04L 12/1827; H04L 45/121; H04L 45/124; H04L 65/4092; H04L 45/24; H04L 45/64; H04L 45/126; H04L 45/122; H04L 45/3065; H04L 65/4076; H04L 67/108; H04L 12/58; H04L 29/12; G06F 15/16; G06F 9/445; G06F 9/46; G06Q 30/00; H04N 21/4788; H04N 21/6405
USPC .......................................... 709/219; 710/104
See application file for complete search history.

(56) References Cited

U.S. PATENT DOCUMENTS 5,414,455 A 5/1995 Hooper et al.
5,442,390 A 8/1995 Hooper et al.
5,455,865 A * 10/1995 Perlman ........................ 713/153
5,857,072 A 1/1999 Crowle
6,330,671 B1 12/2001 Aziz
6,363,416 B1 * 3/2002 Naeimi et al. ................ 709/209
(Continued)

OTHER PUBLICATIONS http://www.ixiacom.com/support/endpoint_library/.*
(Continued)

*Primary Examiner* — Anthony Mejia
*Assistant Examiner* — Mehulkumar Shah
(74) *Attorney, Agent, or Firm* — Finch & Maloney PLLC

(57) ABSTRACT

Techniques and systems for media stream dissemination using a peer-to-peer network are described. A described technique includes joining a peer-to-peer network as a peer; determining whether to be a first source node in the peer-to-peer network; retrieving a media stream from a server based on being the first source node; dividing the media stream into separate portions in a manner consistent with division performed by one or more second source nodes in the peer-to-peer network; generating messages that include the portions, respectively, for dissemination on the peer-to-peer network; and posting the messages to the peer-to-peer network, where the messages are generated such that peers in the peer-to-peer network are able to identify duplicative messages that are posted by the one or more second source nodes, the duplicative messages being based on the media stream.

23 Claims, 8 Drawing Sheets

(56) References Cited

U.S. PATENT DOCUMENTS 6,876,952 B1 4/2005 Kappler et al.
7,035,214 B1 4/2006 Seddigh et al.
7,133,922 B1 11/2006 She et al.
7,304,948 B1 12/2007 Ong
7,657,644 B1* 2/2010 Zheng .......................... 709/231
7,882,207 B1 2/2011 Titmuss et al.
8,171,147 B1* 5/2012 Kaufman et al. ............. 709/228
8,341,688 B2* 12/2012 Ngo .................. H04N 7/17336 725/101
8,380,721 B2* 2/2013 Attaran Rezaei et al. ... 707/748
8,392,530 B1* 3/2013 Manapragada et al. ...... 709/219
2001/0037256 A1 11/2001 Yazawa
2002/0029256 A1 3/2002 Zintel et al.
2002/0143944 A1* 10/2002 Traversat .............. G06F 9/4416 709/225
2002/0150048 A1 10/2002 Ha et al.
2003/0046336 A1 3/2003 D'Annunzio et al.
2003/0063564 A1 4/2003 Ha et al.
2003/0088696 A1 5/2003 McCanne
2003/0191828 A1 10/2003 Ramanathan et al.
2003/0233540 A1 12/2003 Banerjee et al.
2004/0081125 A1 4/2004 Ranta-Aho et al.
2004/0098502 A1 5/2004 Xu et al.
2004/0162871 A1* 8/2004 Pabla ................... H04W 8/005 709/201
2004/0193461 A1 9/2004 Keohane et al.
2004/0196785 A1 10/2004 Janakiraman et al.
2005/0041634 A1* 2/2005 Aura ....................... H04L 41/12 370/351
2005/0163050 A1* 7/2005 Hopkins ...................... 370/231
2006/0039285 A1 2/2006 Chapman et al.
2006/0047831 A1 3/2006 Piper
2006/0053209 A1 3/2006 Li
2006/0167855 A1* 7/2006 Ishikawa ........... G06F 17/30106
2006/0168320 A1 7/2006 Kidd et al.
2006/0173940 A1* 8/2006 Guntupalli et al. .......... 707/206
2006/0250999 A1* 11/2006 Zeng ..................... H04L 12/189 370/312
2006/0251011 A1 11/2006 Ramakrishnan et al.
2007/0070906 A1 3/2007 Thakur
2007/0079327 A1 4/2007 Khoo et al.
2007/0091934 A1 4/2007 Myles et al.
2007/0171927 A1 7/2007 Paik et al.
2007/0201502 A1* 8/2007 Abramson .................... 370/429
2007/0220552 A1 9/2007 Juster et al.
2007/0223379 A1 9/2007 Sivakumar et al.
2007/0226365 A1 9/2007 Hildreth et al.
2007/0250590 A1 10/2007 Flannery et al.
2007/0282905 A1 12/2007 Karlberg
2007/0288638 A1* 12/2007 Vuong et al. ................. 709/226
2008/0049607 A1 2/2008 Xu
2008/0072264 A1* 3/2008 Crayford ......................... 725/86
2008/0134266 A1 6/2008 Kang
2008/0189429 A1* 8/2008 DaCosta ........... H04L 29/06027 709/231
2008/0205394 A1 8/2008 Deshpande et al.
2008/0294788 A1* 11/2008 Wu et al. ...................... 709/231
2008/0301315 A1* 12/2008 Cheng et al. ................. 709/231
2009/0019174 A1* 1/2009 Ehn et al. ..................... 709/231
2009/0063975 A1 3/2009 Bull et al.
2009/0077254 A1* 3/2009 Darcie et al. ................. 709/231
2009/0285096 A1 11/2009 Yousef
2009/0287826 A1 11/2009 Kaufman et al.
2010/0057928 A1 3/2010 Kapoor et al.
2010/0067518 A1 3/2010 Kaufman et al.
2010/0226250 A1 9/2010 Plamondon
2010/0260191 A1* 10/2010 Hiie et al. ..................... 370/400
2010/0284389 A1* 11/2010 Ramsay ............ G06F 17/30017 370/338
2011/0029649 A1* 2/2011 Tian et al. .................... 709/223
2011/0246608 A1* 10/2011 Wu ..................... H04L 65/4084 709/217
2012/0054818 A1* 3/2012 Noh et al. ..................... 725/143
2012/0324090 A1* 12/2012 Gu et al. ....................... 709/223
2013/0003732 A1* 1/2013 Dholakia ................ H04L 12/18 370/390

OTHER PUBLICATIONS http://en.wikipedia.org/wiki/Communication_endpoint.*

"HTTP Dynamic Streaming on the Adobe Flash Platform," 2010, Adobe Systems Incorporated, 18 pages.

"Move Adaptive Stream," Move Networks, Inc., retrieved from internet on Aug. 29, 2008: http://www.movenetworks.com/wp-content/uploads/move-adaptive-stream.pdf, 4 pages.

"Move Media Player," Move Networks, Inc., retrieved from internet on Aug. 29, 2008: http://www.movenetworks.com/wp-content/uploads/move-media-player.pdf, 3 pages.

"Move Networks Solutions," Move Networks, Inc., retrieved from internet on Aug. 29, 2008: http://www.movenetworks.com/why-move/solutions, 4 pages.

"Our Clients," Move Networks, Inc., retrieved from internet on Aug. 29, 2008: http://www.movenetworks.com/why-move/our-clients, 3 pages.

"Real-Time Media Flow Protocol Frequently Asked Questions-External", Jul. 2, 2008. http://download.macromedia.com/pub/labs/flashplayer10/flashplayer10_rtmfp_faq_070208.pdf (accessed on May 8, 2009), 5 pages.

Allman et al., "RFC 2581: TCP Congestion Control", Apr. 1999, 13 pages.

Birney, Bill, "Intelligent Streaming," Microsoft Corporation, May 2003, retrieved from internet: http://www.microsoft.com/windows/windowsmedia/howto/articles/instreaming.aspx?pf=true, 7 pages.

Crowcroft, "Application Level Multicast Architectural Requirements for Apex", downloaded from the Internet, <URL: http://ftp.ist.pt/pub/drafts/draft-crowcroft-apex-multicast-01.txt>, Dec. 12, 2008, 9 pages.

Kaufman et al., "Self Organizing Peer-to-Peer System, Method, and/or Apparatus," U.S. Appl. No. 11/969,186, filed Jan. 3, 2008, 25 pages.

Kaufman et al., "Network Multicast Peer Discovery Methods," U.S. Appl. No. 12/485,821, filed Jun. 16, 2009, 31 pages.

Narten et al, "Neighbor Discovery for IP Version 6 (IPv6)," RFC 2461, Dec. 1998, 83 pages.

Plummer, David C., "An Ethernet Address Resolution Protocol —or— Converting Network Protocol Addresses to 48.bit Ethernet Address for Transmission on Ethernet Hardware," RFC 826, Nov. 1982, 8 pages.

Postel, J. "RFC 768: User Datagram Protocol", Aug. 28, 1980, ISI, 3 pages.

Sano et al., "Improving Efficiency of Application-level Multicast with Network Support", downloaded from the Internet, <URL: http://cat.inist.fr/?aModele=afficheN&cpsidt=15670193>, Dec. 12, 2008 (abstract only), 2 pages.

* cited by examiner

PEER-TO-PEER ASSIST FOR LIVE MEDIA STREAMING

BACKGROUND

This patent document relates to peer-to-peer networks and media streaming.

Live media streaming applications can use one or more techniques to package and deliver a media stream from a source server to one or more viewer clients. The media stream can be sent via packets to the viewer clients over an Internet Protocol (IP) based network using transport layer protocols such as User Datagram Protocol (UDP) or a Transmission Control Protocol (TCP). An additional protocol(s), such as Hypertext Transfer Protocol (HTTP), can be used on top of a transport layer protocol to further facilitate delivery of media fragments within a media stream to a viewer client.

Packets derived from the media stream can be transmitted on a communication network which can forward the packets to one or more endpoints such as networked computers. A network can support one or more different native communication channels such as unicast and multicast. A unicast data packet can be delivered to a specific endpoint over a unicast channel. A multicast data packet can be delivered to multiple endpoints, each belonging to a multicast group, over a native multicast channel.

Multicasting is the ability of one or more endpoints to send one or more packets to multiple recipients, and often, a large number of recipients. Multicasting on an Internet Protocol (IP) based network such as the Internet can include using native network multicast that utilizes an address range reserved for multicasting. If packets are transmitted into a multicast enabled network with a multicast address as the destination, then endpoints subscribed to the multicast, regardless of their location, may receive the packets. Unfortunately, however, such native network multicasting may be disabled between some networks that constitute the Internet. For instance, native network multicasting may work inside an office's local area network but may not work between different local area networks connected by a larger network.

A different type of multicasting can form a virtual multicast channel using unicast channels between different endpoints to effect multicasting. For example, application level multicasting can use an overlay on top of a network, such as the Internet, to effect multicasting between endpoints associated with a communication group, e.g., peers in a peer-to-peer (P2P) network. In some cases, a peer-to-peer network can be implemented as a mesh. An endpoint that is participating in a communication group can be referred to as a peer. Application level multicasting can include forwarding traffic from one endpoint to a different endpoint which, in turn, forwards the traffic to additional endpoints participating in the peer-to-peer network using different unicast channels. An overlay topology associated with a peer-to-peer network can feature endpoints arranged in trees, meshes, rings, arbitrary random topologies, and other distributed structures.

SUMMARY

This document describes, among other things, technologies relating to media stream dissemination using a peer-to-peer network. In one aspect, a described technique includes joining a peer-to-peer network as a peer; determining whether to be a first source node in the peer-to-peer network; retrieving a media stream from a server based on being the first source node; dividing the media stream into separate portions in a manner consistent with division performed by one or more second source nodes in the peer-to-peer network; generating messages that include the portions, respectively, for dissemination on the peer-to-peer network; and posting the messages to the peer-to-peer network, where the messages are generated such that peers in the peer-to-peer network are able to identify duplicative messages that are posted by the one or more second source nodes, the duplicative messages being based on the media stream. Other implementations can include corresponding systems, apparatus, and computer programs, configured to perform the actions of the methods, encoded on computer storage devices.

These and other implementations can include one or more of the following features. Implementations can include receiving a media fragment of the media stream. A media fragment can include a fragment identifier and one or more samples. Dividing the media stream can include dividing the media fragment into sub-fragments in a manner consistent with division performed by the one or more second source nodes. Generating the messages can include generating a first message that includes the fragment identifier, a sub-fragment identifier, and a first sub-fragment of the sub-fragments. Generating the messages can include generating a second message that includes the fragment identifier, a sub-fragment identifier, and a second sub-fragment of the sub-fragments.

In some implementations, joining the peer-to-peer network includes obtaining a group address that is assigned to the peer. Determining whether to be the first source node can include making an autonomous decision whether to be the first source node based on the group address. In some implementations, the autonomous decision is further based on group addresses of other peers in the peer-to-peer network. In some implementations, obtaining the group address includes autonomously deriving the group address based on an autonomously generated cryptographic key. Implementations can include receiving a media fragment of the media stream. Dividing the media stream can include dividing the media fragment into sub-fragments. Posting the messages to the peer-to-peer network can include suppressing propagation of the duplicative messages.

In another aspect, a system can include two or more endpoints that are configured to be respectively two or more peers in a peer-to-peer network. The two or more endpoints can be configured to perform operations that include determining whether to be a first source node in the peer-to-peer network; retrieving a media stream from a server based on being the first source node; dividing the media stream into separate portions in a manner consistent with division performed by one or more second source nodes in the peer-to-peer network; generating messages that include the portions, respectively, for dissemination on the peer-to-peer network; and posting the messages to the peer-to-peer network, where the messages are generated such that peers in the peer-to-peer network are able to identify duplicative messages that are posted by the one or more second source nodes, the duplicative messages being based on the media stream.

In some implementations, the two or more endpoints can be configured to use a multicast communication channel of a local network to discover other peers of the peer-to-peer network. Implementations can include an endpoint configured to use a reorder buffer to store received messages from one or more source nodes of the peer-to-peer network. The reorder buffer can use sub-fragment identifiers of the received messages to reassemble a fragment. The reassembled fragment can be delivered to a media player running on the endpoint.

Particular embodiments of the subject matter described in this document can be implemented so as to realize one or more of the following advantages. One or more of the described technologies that employ a hybrid peer-to-peer network distribution model can reduce load at a media server, which can translate into reduced cost of running said server. Reducing the number of endpoints that communicate directly with a media server can reduce network traffic at network choke-points such as wide area network (WAN) links and private-public network boundaries. The described technologies do not require modifications to existing streaming servers, data formats, or streaming protocols to support the hybrid peer-to-peer network distribution model. Increased bandwidth efficiency can allow higher bandwidth streams, higher quality streams, or both to be delivered to the source nodes of the peer-to-peer network, which can in turn be experienced by all of the viewer clients on the peer-to-peer network.

The details of one or more embodiments of the subject matter described in this document are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
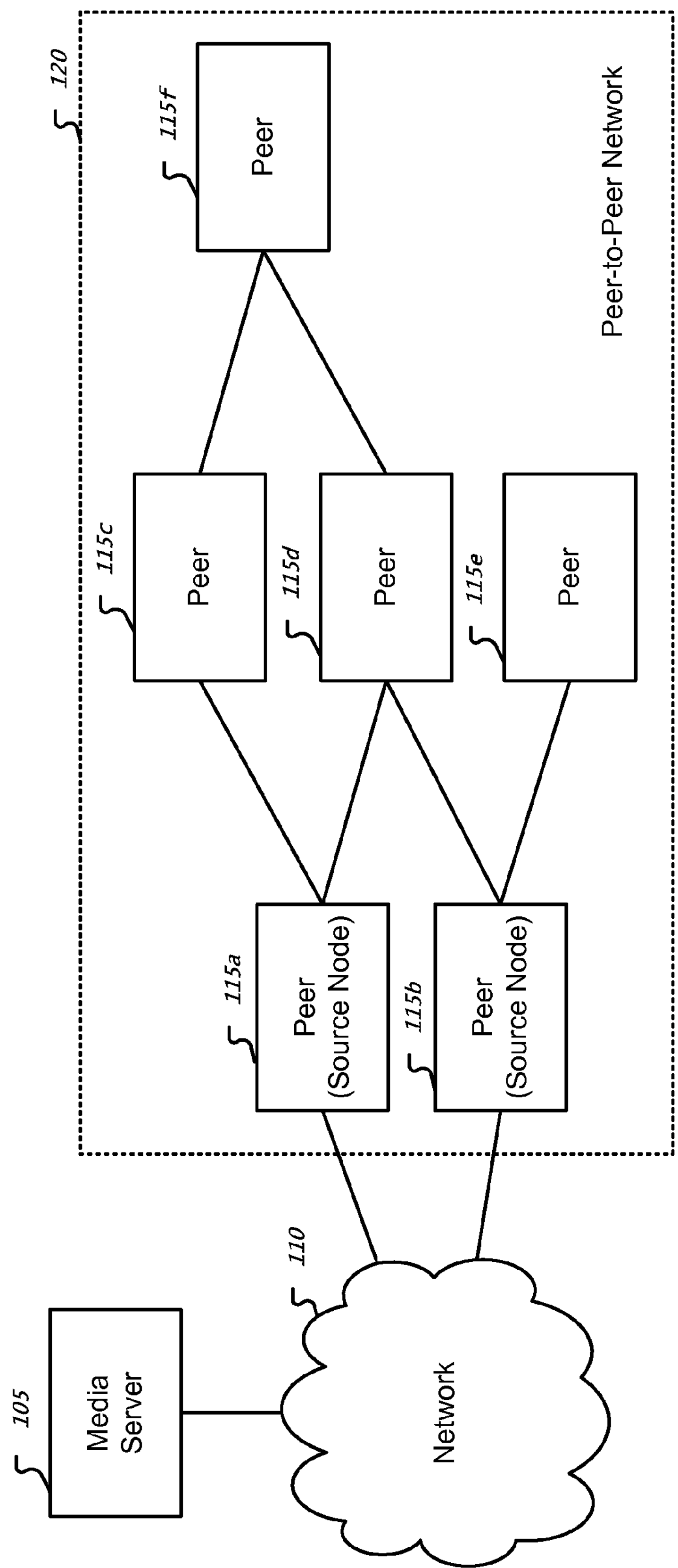
FIG. 1 shows an example of a network architecture for a hybrid peer-to-peer network distribution model.

Live media streaming applications may use a streaming technique such as HTTP Dynamic Streaming (HDS) or HTTP Live Streaming (HLS) to package and deliver a media stream from a media server to one or more viewer clients. Typically, such streaming techniques may require the media server to send separate copies of the media stream to viewer clients that are simultaneously watching the media stream. Further, such streaming techniques may not format media stream packets in a manner conducive for injection into a peer-to-peer multicast environment.

The Secure Real-Time Media Flow Protocol (RTMFP) peer-to-peer multicast system, for example, can divide a stream into a series of fragments. These fragments can typically fit in one UDP datagram. The peer-to-peer multicast system can generate individual media messages (e.g., a message containing a video frame, audio frame, or both) that includes one or more of the fragments. Fragments can be numbered sequentially and contiguously to support balanced, fair, and efficient sharing in a peer-to-peer network. Assigning sequence numbers to the fragments can, therefore, require knowledge of preceding messages since the stream's beginning This requirement may preclude peers that may have missed some portion of the stream from independently assigning sequence numbers in synchrony with other peers in the peer-to-peer network. This sequence number limitation can be mitigated by having a single peer in the group operating to format the stream for distribution on the peer-to-peer network. However, the failure of the single peer may have a detrimental effect on the viewing experience of the other viewers, as the failure may take a long time to detect, during which time no new stream data is injected. A new single injector peer must be elected after failure is detected, and that peer must begin a new peer-to-peer multicast stream sequence; further, all other peers must first time out the previous stream from the failed peer.

It would be advantageous, both in reducing the load on a server as well as reducing the load on shared links of the underlying network(s) with the server, for viewer clients to join together in a peer-to-peer network as peers, to have a subset of the peers each obtain a separate copy of the stream from the server, and to use peer-to-peer techniques to distribute the stream from the subset of peers to the other peers of the group, without requiring modification of the server or of the original streaming method and media stream data format. Thus, this document discloses, among other things, techniques and systems that use a hybrid peer-to-peer network distribution model. Techniques can include using a peer-to-peer group of a peer-to-peer network to assist in the distribution of a media stream, where only a portion of peers in the peer-to-peer group are controlled to retrieve a copy of the media stream, format the stream into messages in a deterministic fashion, and inject the messages into the peer-to-peer network. The portion of peers in the peer-to-peer group can be referred to as source node peers. The techniques can include generating messages such that peers in the peer-to-peer network are able to identify duplicative messages that are injected by two or more source node peers.

Proximate viewers of a live client-server media stream such as HDS or HLS join together to form a peer-to-peer group, for example an RTMFP Group. In some cases, a peer-to-peer group can be implemented as a peer-to-peer mesh. In one example, viewers may join together into an RTMFP group using local area network peer discovery without connecting to a peer introduction service. In another example, viewers may connect to a peer introduction service that may take into account network location information including IP address to determine proximity, and command proximate subsets of viewers to join with each other. The peer-to-peer group can support a message dissemination service, such as the posting method of RTMFP groups, with the property that multiple submissions of identical messages by one or more peers of the group will propagate and deliver to each member in a timely fashion such that two or more identical messages are not propagated over the same link in the peer-to-peer group. Other types of services can be used such as peer-to-peer multicast, flooding a message to multiple peers regardless of whether any destination peer has already received the message, or a gossip based technique.

To limit the number of connections with a media server, an election is held among the peers of the peer-to-peer group to determine the source node peers that will obtain the media stream from the media server. In the event where a source node leaves the group, a new source node can be elected in its place. In some cases, a peer-to-peer group can include two or more peers that are elected as source nodes. The election can be performed autonomously at each peer.

FIG. 1 shows an example of a network architecture for a hybrid peer-to-peer network distribution model. A peer-to-peer network 120 includes one or more peers 115*a*, 115*b*, 115*c*, 115*d*, 115*e*, 115*f*. One or more peers 115*a*, 115*b* of the peer-to-peer network 120 can elect to be source nodes. Source node peers 115*a-b* are the only peers of the peer-to-peer network 120 that connect to a media server system 105 to retrieve a stream from the server system 105. The source node peers 115*a-b* redistribute stream data as separate messages to other peers of peer-to-peer network 120. In some cases, a peer 115*d*, 115*f* can reassemble the stream using messages received from two or more peers and deliver the reassembled stream to a media player for display.

A network 110 such as the Internet can interconnect the source node peers 115*a-b* with the media server system 105. In some implementations, the network 110 can interconnect all of the peers 115*a-f* of the peer-to-peer network 120. In some implementations, a private network interconnects at least a portion of the peers 115*a-f*. In some implementations, the source node peers 115*a-b* can connect to different media servers that provide the same media stream. A media server system 105 includes hardware such as one or more blade servers, one or more server clusters, one or more server farms, or a combination thereof.

Figure 2:
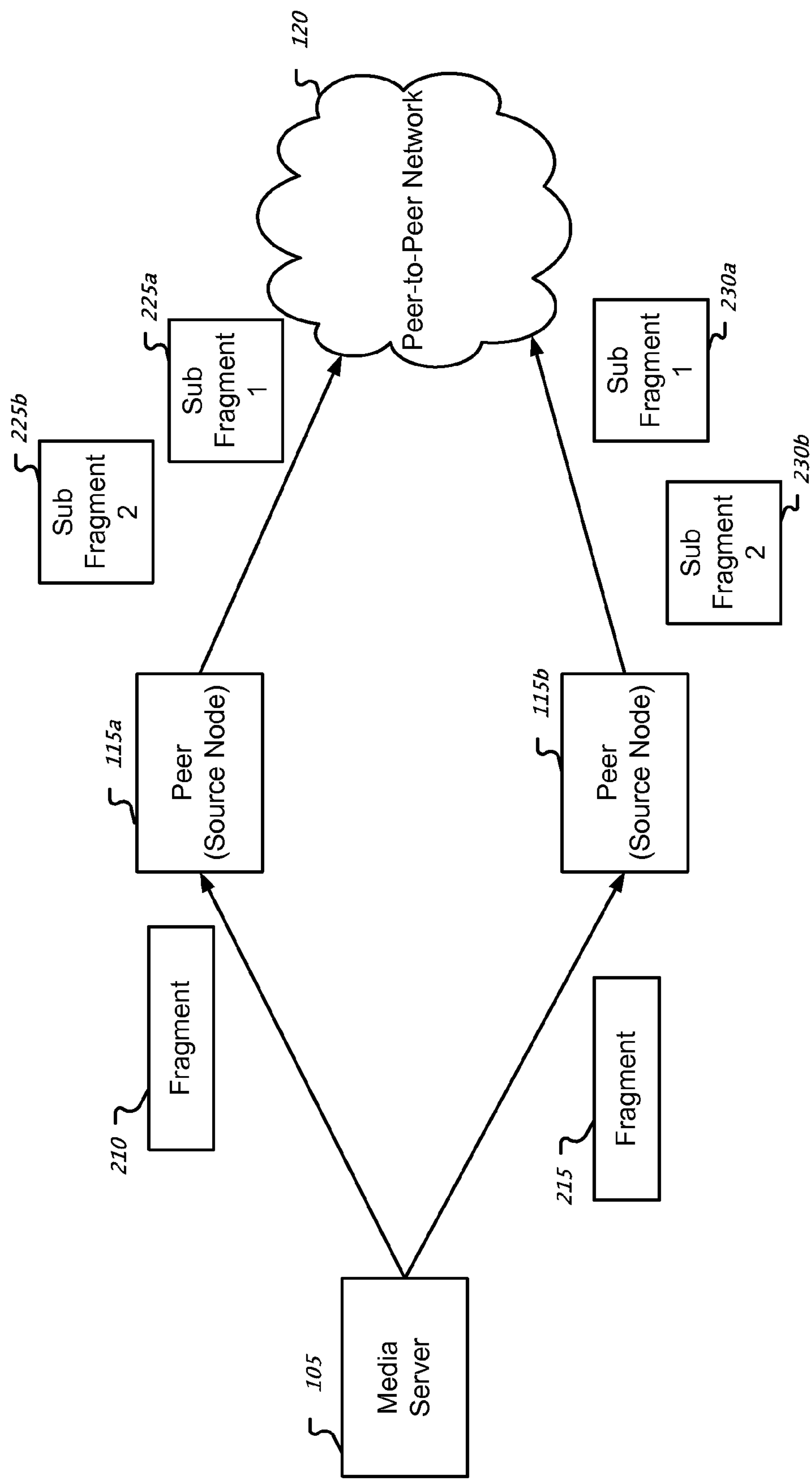
FIG. 2 shows an example of source nodes dividing media streams into separate messages for injection into a peer-to-peer network.

FIG. 2 shows an example of source nodes dividing media streams into separate messages for injection into a peer-to-peer network. Source node peers 115*a-b* can receive a media stream from the media server system 105. In some implementations, each portion of the media stream that a source node peer 115*a-b* receives has the property that any source node retrieving that portion will receive byte-identical media data as any other viewer retrieving the same portion from the media server system 105. A media stream from the media server system 105 can include samples grouped into fragments 210, 215. Various examples of samples include audio samples, video samples, text samples, hint samples, or a combination thereof. Other types of samples are possible. In some implementations, a fragment 210, 215 includes one or more frames, and each frame includes one or more samples. A fragment 210, 215 can be requested from the media server system 105 using a unique resource identifier (URI) that includes one or more levels of sequencing. For example, a URI can specify a segment number and a fragment number within that segment. A received fragment 210, 215 can include a fragment identifier. A fragment identifier can indicate a segment number and a fragment number. Source node peers 115*a-b* retrieving the same time range of the media stream will receive identical fragments 210, 215, albeit encapsulated in differently addressed packets for delivery to said peers 115*a-b*.

For injection into the peer-to-peer network 120, received portions of the media stream can be subdivided into sub-portions in a deterministic manner. In some implementations, each successive 64 KB chunk of a media stream portion can be divided into a sub-portion. Other chunk sizes are possible, for example, 16 KB, 32 KB, and 128 KB. In some implementations, media stream data corresponding to each successive second of time in the media stream can be divided into a sub-portion. Other time durations are possible. In this example, the source node peers 115*a-b* divide their respectively received fragments 210, 215 into two or more sub-fragments 225*a*, 225*b*, 230*a*, 230*b*. Based on receiving identical fragments 210, 215, the source node peers 115*a-b* create identical first sub-fragments 225*a*, 230*a* based on a division characteristic (e.g., a predetermined data size or a predetermined time chunk such as one second), then create identical second sub-fragments 225*b*, 230*b*, and so-on until the end of a fragment 210, 215 is reached. In some implementations, the ordering of the sub-fragments is chronological (e.g., the first one is the oldest one of a fragment and the last one is the newest). The last sub-fragment produced from a fragment 210, 215 can include an indication as to whether this sub-fragment is the final one of the fragments 210, 215.

The source node peers 115*a-b* assemble the sub-fragments 225*a-b*, 230*a-b* into separate messages and inject the messages into the peer-to-peer network 120. Injecting a message can include broadcasting a message identifier within the peer-to-peer network 120 such that other peers can request a message by its identifier. Based on identical messages having identical message identifiers, duplicative message traffic is suppressed within the peer-to-peer network 120. Peers can reassemble sub-fragments back into a fragment and provide the reassembled fragment to a media player (e.g., an ADOBE ® FLASH ® Player or Moving Picture Experts Group (MPEG) player) for display to a viewer.

In some implementations, source nodes obtain, in sequence, the most recent portion, or live portion in the case of a live streaming event, of a stream from a server and divide the portion into one or more sub-portions. For each sub-portion, each source node assembles in a consistent manner a message that includes a sub-portion sequence part, a sub-portion sequence number, the media data of the sub-portion, and an indication to whether this sub-portion is the final one of a portion. The peers, including source nodes and non-source nodes, in a group receive exactly one copy of each distinct message in accordance to a peer-to-peer message dissemination service. Due to varying network and computation conditions and resources of the many peers of the group and the implementation of the message dissemination service, messages may arrive out of order. Each peer can use a buffer in which to hold received sub-portions for a time, in which the sub-portions' order may be restored according to the sequencing information in the messages. Buffered messages are submitted for display after the reassembly allowance period or if they are contiguous with the previously submitted message according to the sequencing information. The final sub-portion indicator can be used to detect continuity with the first sub-portion of the next portion to avoid the reassembly delay. In some cases, messages received with sequencing information prior to the message most recently submitted for display are discarded.

Figure 3:
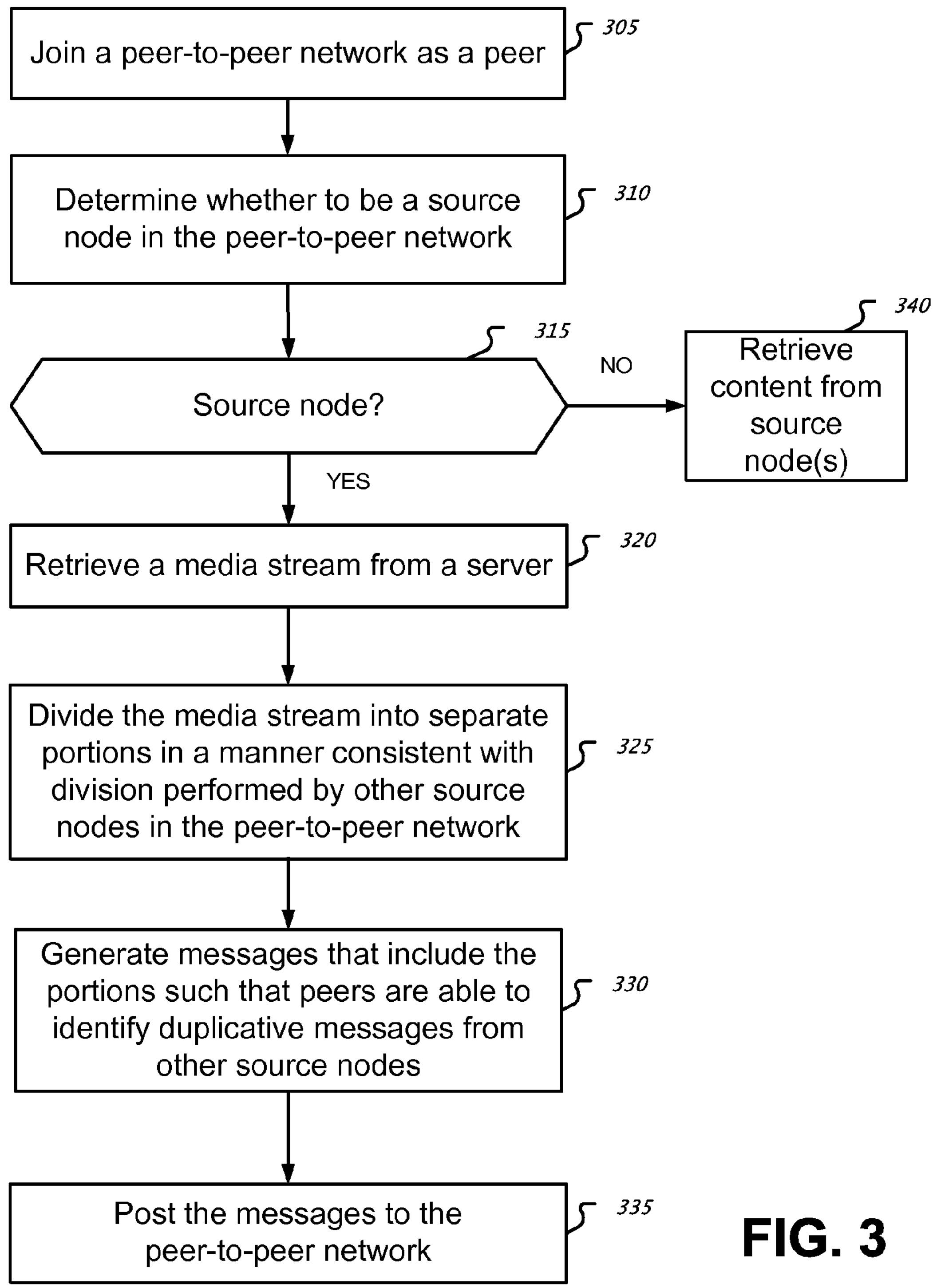
FIG. 3 shows an example of a peer-to-peer network process performed by a device.

FIG. 3 shows an example of a peer-to-peer network process performed by a device. At 305, the device joins a peer-to-peer network as a peer. The peer can join a group within the peer-to-peer network to exchange data specific to that group. Joining the peer-to-peer network can include calculating a Peer-ID. In some implementations, a Peer-ID is a unique 256-bit cryptographic pseudorandom identifier that identifies a peer within the peer-to-peer network. In some implementations, a Peer-ID is a hash of an input that includes a cryptographic public key. The hash can be a SHA256 hash; other types of hashes are possible.

At 310, the device determines whether to be a source node in the peer-to-peer network. Determining whether to be a source node can include making an autonomous decision, via an election procedure, based on the source node's group address. For example, an election procedure for peers of an RTMFP group can be based on the numeric group address derived for each peer in the group, where the elected peers are those having numeric group addresses that are nearest to at least one of a list of at least two well-known addresses (e.g., predetermined numerical values) in a group address space. In an RTMFP group, the mesh interconnection topology can let each peer independently determine whether or not it is nearest to any given group address without additional communication with any other peer.

Based on being a source node at 315, the device retrieves a media stream from a server at 320. Retrieving a media stream can include sending a server a uniform resource identifier (URI) that contains a media stream identifier. In some implementations, the device receives one or more media fragments of the media stream from the server.

At 325, the device divides the media stream into separate portions in a manner consistent with division performed by one or more other source nodes in the peer-to-peer network. In some implementations, the size of the portions is based on a predetermined size that is known to all of the source nodes. In some implementations, the predetermined size is based on a maximum length of a packet such that the packet will not be fragmented during transit. Dividing the media stream, at 325, can include dividing the media fragment into sub-fragments. In some implementations, the boundaries of the portions are based on a fragment index and a fragment length. For example, based on all of the source nodes receiving the same media fragment from the server, the source nodes can use one or more predetermined division parameters to split the media fragment into the exact same portions.

At 330, the device generates messages that include the portions such that peers are able to identify duplicative messages from other source nodes. At 335, the device posts the messages to the peer-to-peer network. Posting a message to the peer-to-peer network can include transmitting a message identifier. The message identifier can be a hash of the message. For example, based on performing the media stream division the same way, the source nodes will generate the same messages (e.g., if two messages have the same content, then the messages will have the same header and, hence, hash to the same message identifier). If a peer sees multiple peers advertising a message with the same message identifier (e.g., the message is available for retrieval from more than one peer), the peer is able to recognize duplicate messages and will only request the message from one of the advertising peers.

Based on not being a source node at 315, the device, at 340, retrieves content from one or more source nodes instead of retrieving content from the server. In some cases, a peer retrieves content from a source node via one or more intermediary peers. In some cases, a peer can monitor for peers joining or leaving a group. In some implementations, a peer can monitor for a time-out condition where a source node peer stops transmissions; this can indicate a failure and cause an automatic removal of the source node peer from the group. Based on a change in the number of peers in a group, a peer can re-determine at 310, whether to be a source node.

Figure 4:
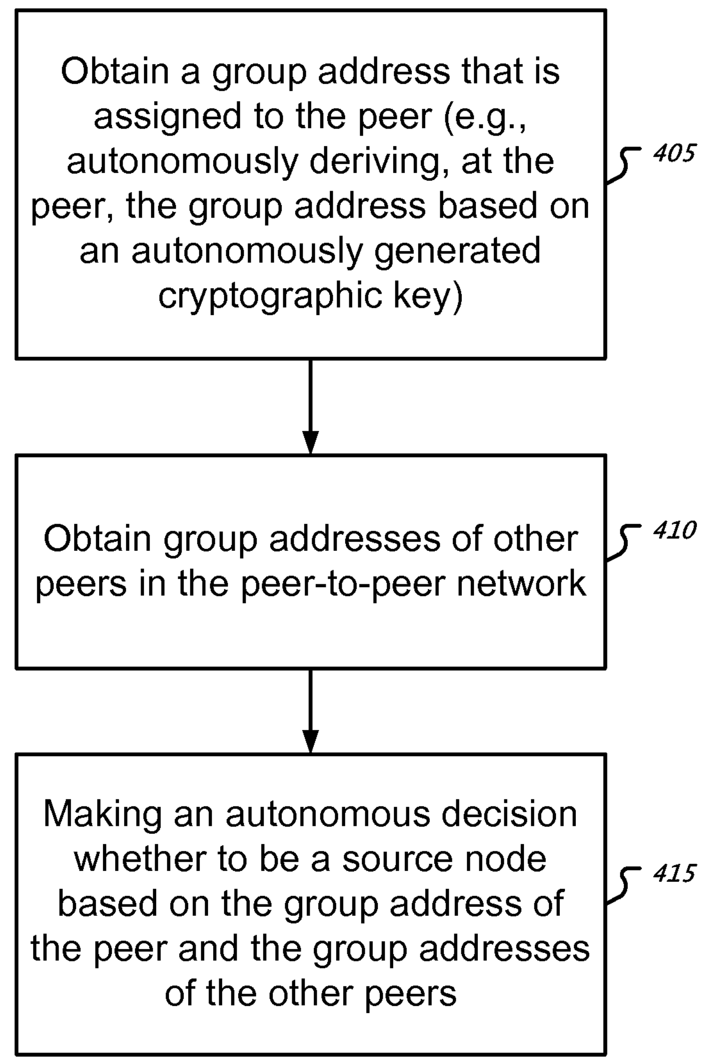
FIG. 4 shows an example of a process to determine whether to be a source node.

FIG. 4 shows an example of a process to determine whether to be a source node. A peer in a peer-to-peer network can implement a process to determine whether to be a source node. At 405, the process includes obtaining a group address that is assigned to the peer. Obtaining the group address can include autonomously deriving, at the peer, the group address based on an autonomously generated cryptographic key. In some implementations, such as ones that use RTMFP, the group address is a hash of information including a Peer-ID, where the Peer-ID is a hash of information based on a cryptographic public key (such as the public key in a public-private key pair).

At 410, the process includes obtaining group addresses of other peers in the peer-to-peer network. Obtaining group addresses of other peers can include listening for messages (e.g., advertisement or broadcast messages) from other peers and extracting group addresses from received messages. At 415, the process includes making an autonomous decision whether to be a source node based on the group address of the peer and the group addresses of the other peers. In some implementations, the autonomous decision is based on the first source node's group address and a total number of peers that have joined a peer-to-peer network. For example, the total number of peers can determine the number of source nodes that are elected. In some implementations, given the total number N of peers that have joined a peer-to-peer group, the number of source node peers can be equal to, or approximately equal to, log N. In some implementations, the number of source node peers can be equal to, or approximately equal to $\sqrt{N}$. In some implementations, the number of source node peers can be equal to, or approximately equal to, a fraction of N (e.g., ¼ of N). In some implementations, the autonomous decision is based on the first source node's group address and the group addresses of other nodes in the group that are numerically adjacent to the peer's group address. For example, given peers A and B such that A's address precedes B's address on a ring (e.g., a ring mod $2^{128}$, a ring mod $2^{256}$, etc.), A and B are numerically adjacent if there is no peer X such that A's address precedes X's address and X's address precedes B's address; that is, there are no other peers with an address that falls between the addresses of A and B on the ring.

Figure 5:
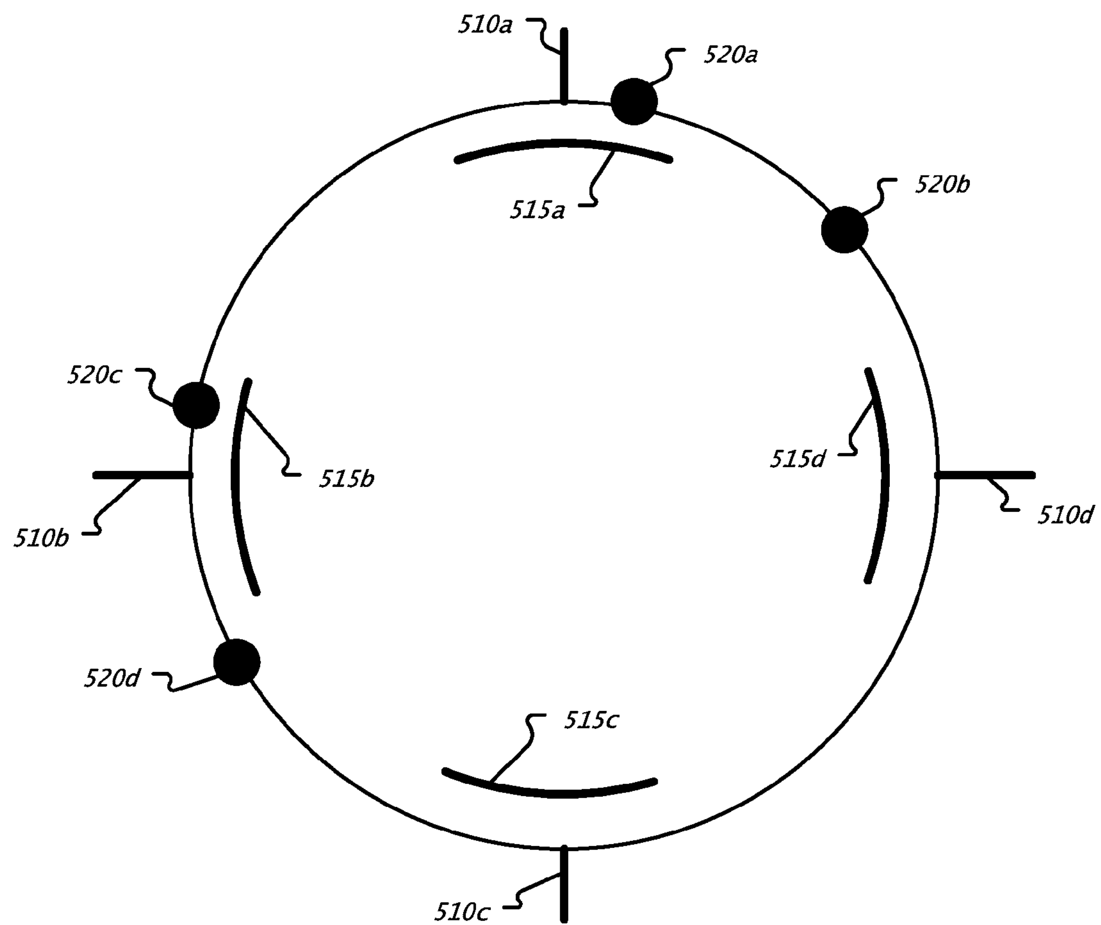
FIG. 5 shows an example of a ring structure for determining whether to be a source node in a peer-to-peer network based on one or more group addresses.

FIG. 5 shows an example of a ring structure for determining whether to be a source node in a peer-to-peer network based on one or more group addresses. A peer can derive its group address based on taking a hash of information including its Peer-ID. In some implementations, group addresses are 256-bit values. Such values can be represented as 64-digit hex strings. Group addresses can be depicted as points on a ring 500 such as a ring mod $2^{256}$. Peers can determine whether to be a source node based on comparing their group addresses 520*a*, 520*b*, 520*c*, 520*d* with designated points 510*a*, 510*b*, 510*c*, 510*d* on the ring 500 and corresponding ranges 515*a*, 515*b*, 515*c*, 515*d* about the points 510*a-d*. A first peer having a corresponding group address 520*a* that is within a range 515*a* of a first designated point 510*a* can deem itself as a source node. Likewise, a second peer having a corresponding group address 520*c* that is within a range 515*b* of a second designated point 510*b* can deem itself as a source node. However, peers with corresponding group addresses 520*d*, 520*b* that are not included in any range of any of the designated points 510*a*, 510*b*, 510*c*, 510*d* will not be a source node given the current state of the peer-to-peer network. In some implementations, the quantity of designated points 510*a-d* is based on a total number N of peers in a group (e.g., $\sqrt{N}$ or log N). The locations of the designated points 510*a-d* on the ring 500 can be based on dividing the ring 500 into equidistant ring segments based on the quantity of designated points 510*a-d*. In this example, since there are four designated points 510*a-d*, the ring 500 is divided into four segments, with each segment having a designated point.

As peers leave and join the peer-to-peer network, the quantity and location of the designated points 510*a-d* can change, and thus, the determination of whether to be a source node can be repeated. For example, based on a source node peer leaving the peer-to-peer network, a non-source node peer may become a source node peer. In some implementations, peers know the group addresses of all of the other peers in the group. In some implementations, peers know the group addresses of a sub-set of peers within the group (e.g., peers that reside on the same physical network segment), which may be less than all of the other peers in the group. The peers having group addresses that are closest to at least one of the designated points 510*a-d* can elect to be source nodes. While unlikely, if two peers have group addresses that are equidistant, modulo the ring size, from a designated point, then both may elect to be a source node peer.

Figure 6:
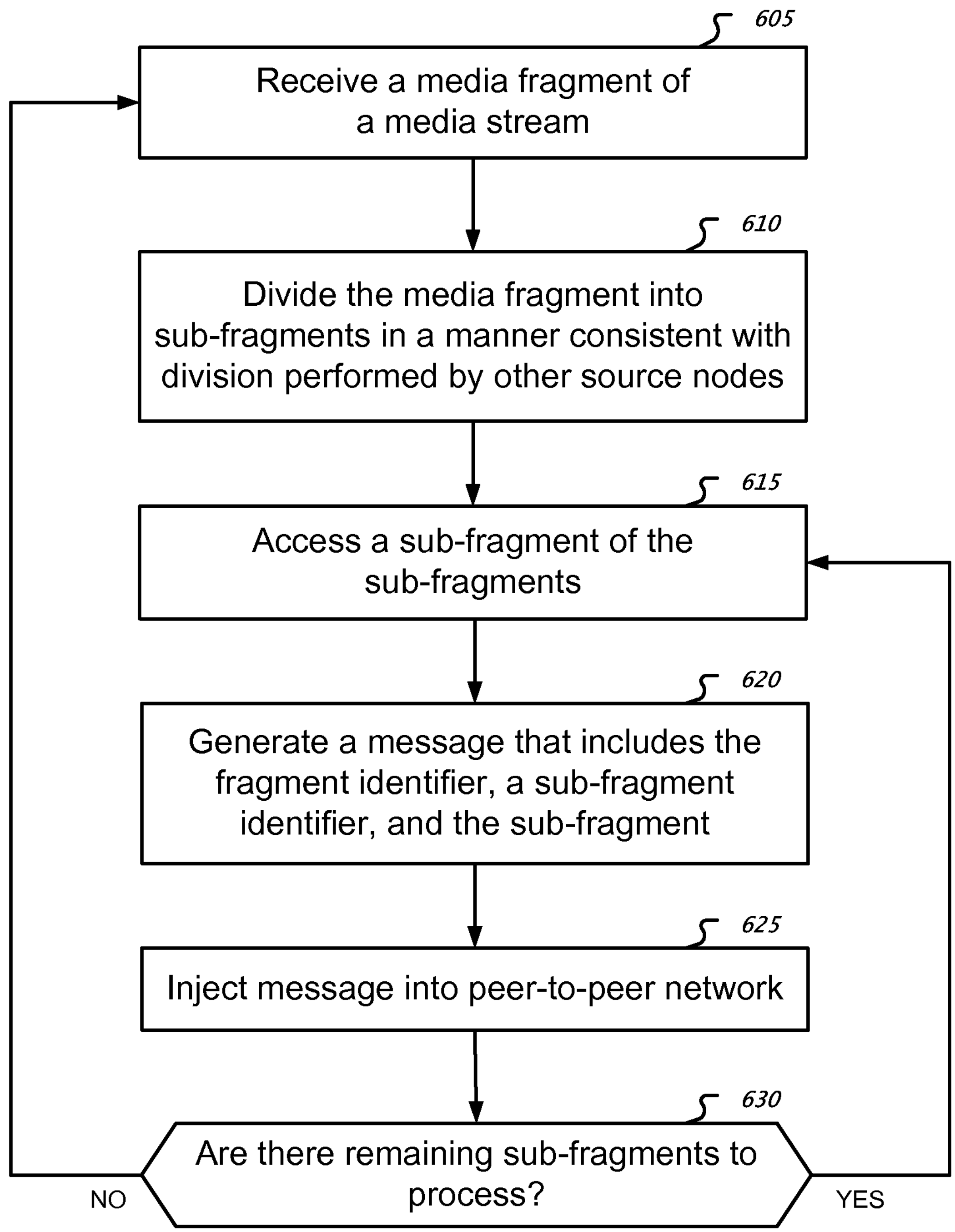
FIG. 6 shows an example of a process performed by a source node peer in a peer-to-peer network.

FIG. 6 shows an example of a process performed by a source node peer in a peer-to-peer network. At 605, a source node receives a media fragment of a media stream. The media fragment can include a fragment identifier and one or more samples. For example, the media fragment can include a fragment identifier, one or more audio samples, and one or more video samples. At 610, the source node divides the media fragment into sub-fragments in a manner consistent with division performed by other source nodes. For example, the source node can use one or more division characteristics that are known by all of the peers acting as source nodes within a peer-to-peer group. Various examples of the division characteristics include a predetermined data size, a predetermined time chunk (e.g., one second or 250 milliseconds), or media type (e.g., a fragment having both audio data and video data is divided into a sub-fragment for audio data and a sub-fragment for video data). Dividing the media fragment into sub-fragments can include generating a list of indexes into a data structure storing the media fragment, where the indexes denote the beginning of a sub-fragment.

At 615, the source node accesses a sub-fragment of the sub-fragments. Accessing a sub-fragment can include reading data using an index into an array of sub-fragments. At 620, the source node generates a message that includes the fragment identifier, a sub-fragment identifier, and the sub-fragment. At 625, the source node injects the message into the peer-to-peer network. At 630, the source node determines whether there are remaining sub-fragments to process. If there is at least one remaining sub-fragment, the source node repeats the accessing at 615, generating at 620, and injecting at 625 using the next sub-fragment. When there are no more remaining sub-fragments, the source node, at 605, receives another media fragment of the media stream and repeats the process.

A hybrid peer-to-peer distribution technique can include using network-level multicast such as native IP multicast to distribute content from source node peers to other peers in a peer-to-peer network. Further, the technique can include using network-level multicast to provide group members information about additional peers that are on a local network. In some networks, particularly enterprise networks, peer-to-peer communication outside of the local network (for example, with peers on the Internet) may be blocked or otherwise unavailable, precluding the use of peer-to-peer multicast directly from the source server. Additionally, few currently deployed internetworks support native IP multicast for live stream distribution. For a popular event, there may be a large number of viewers that are proximate in the network. For example, many viewers may be on one LAN segment, such as on one floor of a large office building. The hybrid peer-to-peer distribution technique can be used to interconnect such viewers in a bandwidth efficient manner.

To establish, and expand, a communication group such as a group within a peer-to-peer network, participating peers should know at least one other peer in the group. Some communication groups can use a bootstrapping method to expand the group's membership knowledge. For example, a new peer is given the address of one or more existing peers and those existing peers send information about other members. In some peer-to-peer networks such as a conventional gossip-based peer-to-peer network, the likelihood of discovering a peer that is on the same local network through randomly probing or communicating with different peers in the peer-to-peer network may be difficult or unlikely when the total number of participants is significantly larger than the number of participants on a local network. In some instances, heuristics such as those based on network addresses for attempting to find local peers can be hindered by procedures such as Network Address Translation (NAT) and by the decoupling of network addresses and physical network layout.

Upon joining a communication group, a peer connected to a local area network (LAN) can multicast to the LAN a participation information request message. Thereafter, the peer can periodically send additional participation information request messages. A participation information request message can be indicative of the peer's participation in the communication group and can be indicative of the peer's request to receive messages from other peers already established in that group. The message can include a solicitation for other peers that are participating in the communication group. The peer can establish communications with others peers in the communication group via unicast channels before sending a multicast message.

A peer that is responding to a participation information request can multicast a response, and other peers that might respond can monitor such responses in order to ensure that the number of responses to a single query is kept reasonably small, e.g., five responses to a single query. A peer receiving information about a new potential neighbor can wait to add the newly-discovered endpoint as a neighbor. For example, a peer receiving information about a new potential neighbor can add that potential neighbor to its list of known participants and then perform a sort of the list to determine if this potential neighbor is a better neighbor to communicate with than a different neighbor on its list. For example, as the number of peers receiving this new peer's announcement increases, the number of peers which will attempt to connect to the announcing endpoint can increase in a logarithmic fashion such that the number of connection attempts can be nearly constant for any number of peers receiving such new announcement.

A communication group can use a self-organizing network topology to arrange communications between peers. A self-organizing network topology can refer to a network topology where endpoints determine a network topology based, at least in part, on direct communication between peers. For example, peers can directly communicate with one another to share information regarding other peers available on the peer-to-peer network, so that individual peers can gather information regarding the network topology. In some implementations, a peer can request or determine information relating to one or more different peers available for communication. For example, a peer can request information relating to one or more performance characteristics of the other peers, such as a latency time, bandwidth, file transfer time, or a network reliability metric associated with a peer. In a different example, the peer can determine performance characteristics of other peers based, at least in part, on communication with the other peers.

Conditions associated with one or more peers or communication networks there between can change from time to time. Accordingly, the network topology of a communication group can change based on such conditions. Moreover, members of a communication group can change and can have their numbers increase or decrease. For example, a communication latency associated with one of the peers can change over time due to a variety of factors, including local conditions associated with the peer, network conditions associated with the peer, or both. Peers can use native network multicast services to locate lower latency endpoints and to monitor for new peers in a local portion of a communication group to effect changes in a communication topology.

Figure 7:
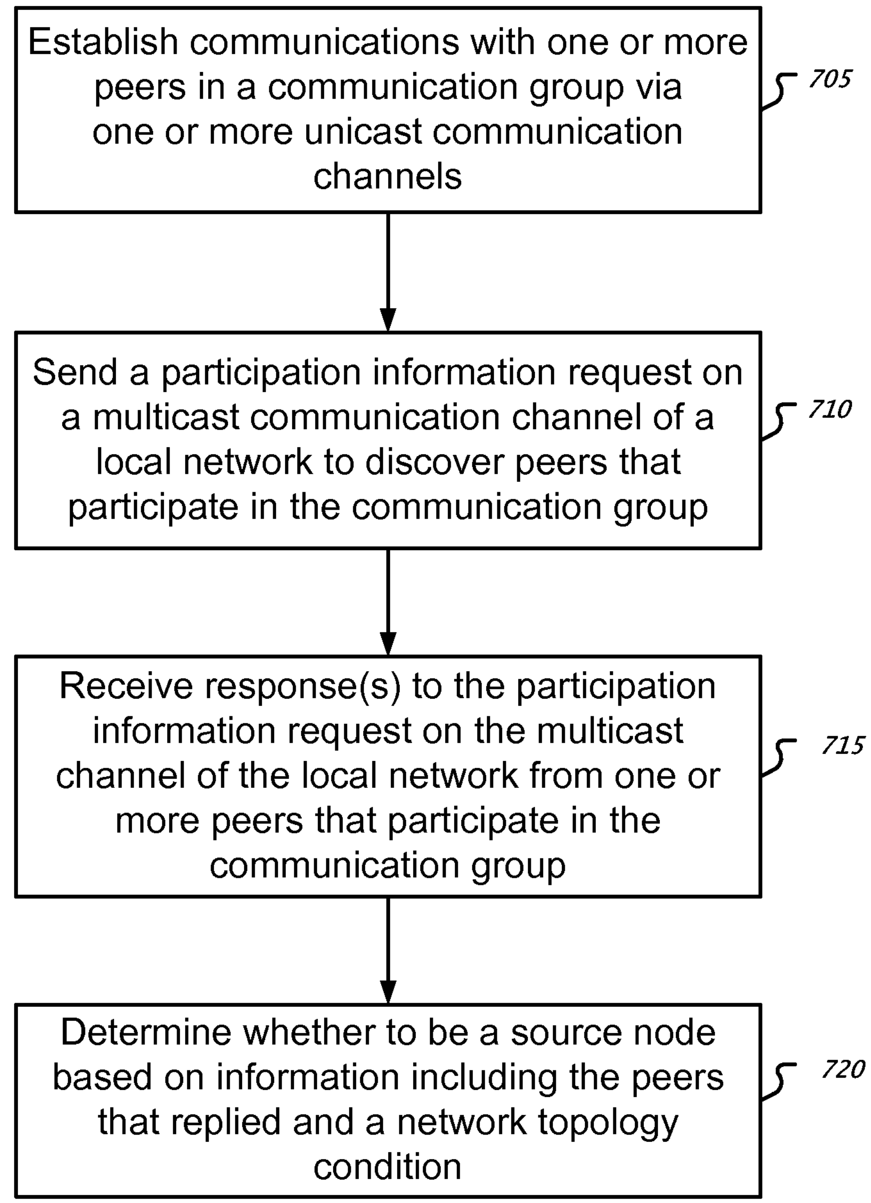
FIG. 7 shows an example of a technique to solicit participation information from peers in a communication group that reside on a local network.

FIG. 7 shows an example of a technique to solicit participation information from peers in a communication group that reside on a local network. At 705, an endpoint establishes communications with one or more peers in a communication group via one or more unicast communication channels. In some implementations, the endpoint can receive information that includes an initial set of peers; the information can include one or more addresses, e.g., IP addresses, corresponding to one or more endpoints that are peers in the communication group. The endpoint can use the one or more addresses to establish separate unicast connections with the peers.

At 710, the endpoint sends a participation information request on a multicast communication channel of a local network to discover other endpoints on the local network that are peers in the communication group. Sending the participation information request on the multicast communication channel can include transmitting an IP multicast data packet. In some implementations, the multicast data packet has an IP multicast address associated with the communication group as the packet's destination address. In some implementations, the endpoint can set a time-to-live (TTL) field of the multicast data packet to one to limit the multicast data packet to the local network or at least a portion of the local network.

At 715, the endpoint receives one or more responses to the participation information request on the multicast channel of the local network. In some implementations, the endpoint can receive a response to the participation information request via a unicast channel. At 720, the endpoint determines whether to be a source node based on information including the received responses, a network topology condition (e.g., latency between endpoints or bandwidth capacity between endpoints), or a combination thereof. In some implementations, a response to a participation information request includes a group address of the responding peer. The responses can be used by the endpoint to determine whether its corresponding group address is the closest to one or more predetermined group address values. Based on being the closest, the endpoint elects itself to be a source node. In some implementations, an endpoint uses the multicast channel to determine a set of local peers in a peer-to-peer group based on the received responses. In some cases, the local peers can be located on the same LAN segment. The number of local peers can be used to calculate the total number of source node peers that can be elected within the set of local peers.

Figure 8:
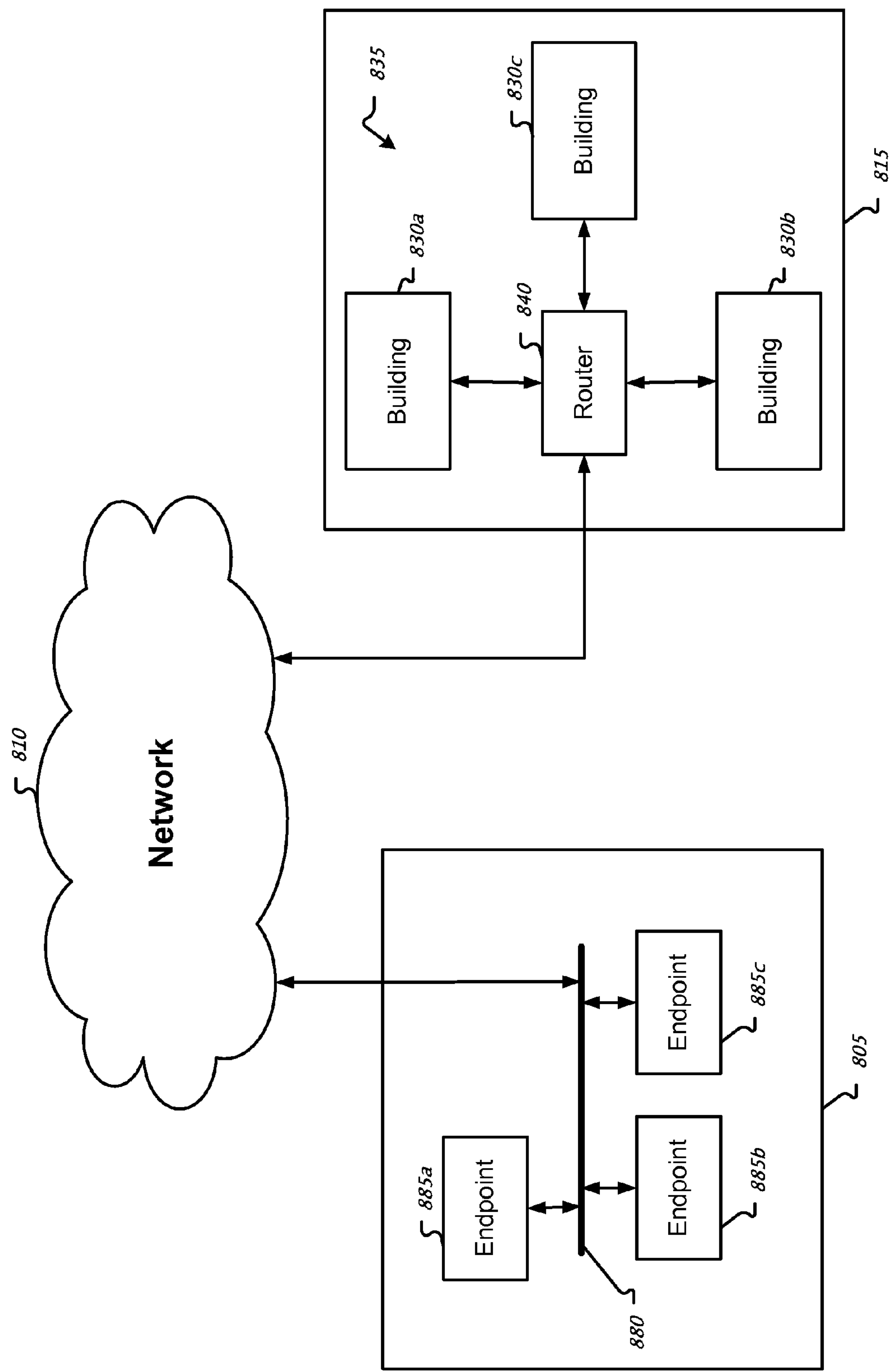
FIG. 8 shows an example of a network architecture that includes a native multicast network.

FIG. 8 shows an example of a network architecture that includes a native multicast network. A network 810 such as the Internet can connect local networks in different locations such a building 805 at one location and a campus 815 at a different location. A building 805 can include a local network 880 such as Ethernet to connect different endpoints 885*a*, 885*b*, 885*c* within the building. Endpoints 885*a-c* can be peers in a peer-to-peer network. In some implementations, a local network 880 can include an Ethernet hub that connects endpoints 885*a-c* on the local network 880. In some implementations, a local network 880 can include a switch or a router that individually communicates with endpoints 885*a-c* on the local network 880. In some implementations, a local network 880 can include a wireless network that supports IP multicast. A campus 815 can include a local network 835 that extends into multiple buildings 830*a*, 830*b*, 830*c*. Endpoints in buildings 830*a-c* located on the campus 815 can be networked with endpoints in different buildings via one or more networking devices, e.g. switch or router 840, of a local network 835. In some implementations, the campus's local network 835 can include a switch or a router 840 capable of native IP multicast.

In some implementations, an endpoint 885*a-c* can be configured to use a reorder buffer to store received messages. A reorder buffer can use sub-fragment identifiers of the received messages to reassemble a fragment. The endpoint 885*a-c* can deliver the reassembled fragment to a media player running on the endpoint 885*a-c*.

Various endpoints can include computing devices such as a personal computer or a computer such as a server. An endpoint can include one or more processors that can be programmed or configured to perform one or more operations mentioned in this document. In some implementations, a processor can include multiple processors or processor cores. A network endpoint can be identified as a client, a server, or both, but in any case, a network endpoint necessarily includes some hardware since it includes a physical device.

Endpoints can establish connections with other endpoints using protocols such as UDP or TCP. A network endpoint can run one or more applications that include support for peer-to-peer networks such as ADOBE® FLASH® Player or ADOBE® AIR® software, available from Adobe Systems Incorporated, of San Jose, Calif. In some implementations, a network endpoint can communicate on a peer-to-peer network using RTMFP. A network endpoint can use one or more network interfaces. In some implementations, one network interface can be used for both unicast and multicast traffic. A local network can carry both unicast and multicast traffic.

Some communication group implementations can use one or more techniques to safe-guard data and identities. A communication group can use an encryption technique to protect data on a peer-to-peer network. A communication group can use an authentication technique to verify peers that send data. Various encryption and authentication techniques can use a digital key or private and public key pairs. Members of a communication group can obtain or generate a digital key to encrypt data, decrypt data, authenticate communications, or a combination thereof. Accordingly, in some implementations, a peer can use a digital key associated with the communication group to authenticate or decrypt responses or stream data from other peers.

Embodiments of the subject matter and the operations described in this document can be implemented in digital electronic circuitry, or in computer software, firmware, or hardware, including the structures disclosed in this document and their structural equivalents, or in combinations of one or more of them. Embodiments of the subject matter described in this document can be implemented as one or more computer programs, i.e., one or more modules of computer program instructions, encoded on a computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this document can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this document can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this document can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this document, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this document contains many specific implementation details, these should not be construed as limitations on the scope of the invention or of what may be claimed, but rather as descriptions of features specific to particular embodiments of the invention. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method implemented by a data processing apparatus, the method comprising:

joining a peer-to-peer network, by a first peer, as an ordinary peer, wherein the first peer obtains a group address as a result of joining the peer-to-peer network;

making a determination that the group address obtained by the first peer (a) falls within a particular one of a plurality of address ranges, and (b) is not further from a designated point than group addresses for other peers in the peer-to-peer network, wherein the particular address range is defined around the designated point;

in response to making the determination, making an autonomous decision, by the first peer, to change from being the ordinary peer to being one of a plurality of source nodes in the peer-to-peer network;

retrieving, by the first peer, a media stream from a server based on being one of the plurality of source nodes;

dividing, by the first peer, the media stream into separate portions consistent with division performed by other source nodes in the peer-to-peer network, wherein the media stream is divided by the source nodes in the peer-to-peer network;

generating messages, by the first peer, wherein the generated messages include the portions, respectively, for dissemination on the peer-to-peer network; and posting the messages to the peer-to-peer network by the first peer, wherein the messages enable other peers in the peer-to-peer network to identify duplicative messages that are posted by the other source nodes, the duplicative messages being based on the media stream.

2. The method of claim 1, further comprising:

receiving a media fragment of the media stream, the media fragment including a fragment identifier and one or more samples, wherein dividing the media stream comprises dividing the media fragment into sub-fragments consistent with division performed by the other source nodes, and wherein generating the messages comprises:

generating a first message that includes the fragment identifier, a first sub-fragment identifier, and a first sub-fragment of the sub-fragments; and generating a second message that includes the fragment identifier, a second sub-fragment identifier, and a second sub-fragment of the sub-fragments.

3. The method of claim 1, wherein the autonomous decision is further based on group addresses of the other peers in the peer-to-peer network that reside on a same physical network segment as the first peer.

4. The method of claim 1, wherein obtaining the group address comprises autonomously deriving the group address based on an autonomously generated cryptographic key.

5. The method of claim 1, further comprising:

receiving a media fragment of the media stream, wherein dividing the media stream comprises dividing the media fragment into sub-fragments.

6. The method of claim 1, wherein posting the messages to the peer-to-peer network comprises suppressing propagation of the duplicative messages.

7. The method of claim 1, wherein making the determination further comprises determining that the designated point is equidistant from (a) the group address obtained by the first peer and (b) any group addresses obtained by the other peers in the peer-to-peer network.

8. A system comprising:

two or more endpoints that are configured to be respectively two or more peers in a peer-to-peer network, wherein each of the two or more endpoints comprises a computer device that includes a processor, and wherein each of the two or more endpoints is associated with a group address obtained as a result of joining the peer-to-peer network, the two or more endpoints being configured to perform operations comprising:

making a determination that the group address obtained by a first one of the endpoints (a) falls within a particular one of a plurality of address ranges, and (b) is not further from a designated point than the group address obtained by a second one of the endpoints, wherein the particular address range is defined around the designated point;

in response to making the determination, making an autonomous decision, by the first endpoint, to change from being an ordinary peer to being one of a plurality of source nodes in the peer-to-peer network;

retrieving a media stream from a server based on being one of the plurality of source nodes;

dividing, by the first endpoint, the media stream into separate portions consistent with division performed by other source nodes in the peer-to-peer network, wherein the media stream is divided by the source nodes in the peer-to-peer network;

generating messages that include the portions, respectively, for dissemination on the peer-to-peer network; and posting the messages to the peer-to-peer network, wherein the messages enable other peers in the peer-to-peer network to identify duplicative messages that are posted by the other source nodes, the duplicative messages being based on the media stream.

9. The system of claim 8, the operations further comprising:

receiving a media fragment of the media stream, the media fragment including a fragment identifier and one or more samples, wherein dividing the media stream comprises dividing the media fragment into sub-fragments consistent with division performed by the other source nodes, and wherein generating the messages comprises:

generating a first message that includes the fragment identifier, a first sub-fragment identifier, and a first sub-fragment of the sub-fragments; and generating a second message that includes the fragment identifier, a second sub-fragment identifier, and a second sub-fragment of the sub-fragments.

10. The system of claim 9, further comprising:

a particular endpoint configured to use a reorder buffer to store received messages from the plurality of source nodes of the peer-to-peer network, wherein the reorder buffer uses sub-fragment identifiers of the received messages to reassemble a fragment, and wherein the reassembled fragment is delivered to a media player running on the particular endpoint.

11. The system of claim 8, wherein the autonomous decision is further based on group addresses of the other peers in the peer-to-peer network that reside on a same physical network segment as the first endpoint.

12. The system of claim 8, wherein the group addresses are derived based on an autonomously generated cryptographic key.

13. The system of claim 8, the operations further comprising:

receiving a media fragment of the media stream, wherein dividing the media stream comprises dividing the media fragment into sub-fragments.

14. The system of claim 8, wherein posting the messages to the peer-to-peer network comprises suppressing propagation of the duplicative messages.

15. The system of claim 8, wherein the two or more endpoints are configured to use a multicast communication channel of a local network to discover other peers of the peer-to-peer network.

16. The system of claim 8, wherein making the determination further comprises determining that the designated point is equidistant from the group addresses associated with the first and second endpoints.

17. A computer storage device encoded with a computer program, the program comprising instructions that when executed by data processing apparatus cause the data processing apparatus to perform operations comprising:

joining a peer-to-peer network, by a first peer, as an ordinary peer, wherein the first peer obtains a group address as a result of joining the peer-to-peer network;

making a determination that the group address obtained by the first peer (a) falls within a particular one of a plurality of defined address ranges, and (b) is not further from a designated point than group addresses for other peers in the peer-to-peer network, wherein the particular address range is defined around the designated point;

in response to making the determination, making an autonomous decision, by the first peer, to change from being the ordinary peer to being one of a plurality of source nodes in the peer-to-peer network;

retrieving, by the first peer, a media stream from a server based on being one of the plurality of source nodes;

dividing, by the first peer, the media stream into separate portions consistent with division performed by other source nodes in the peer-to-peer network, wherein the media stream is divided by the source nodes in the peer-to-peer network;

generating messages, by the first peer, wherein the generated messages include the portions, respectively, for dissemination on the peer-to-peer network; and posting the messages to the peer-to-peer network by the first peer, wherein the messages enable other peers in the peer-to-peer network to identify duplicative messages that are posted by the other source nodes, the duplicative messages being based on the media stream.

18. The device of claim 17, the operations further comprising:

receiving a media fragment of the media stream, the media fragment including a fragment identifier and one or more samples, wherein dividing the media stream comprises dividing the media fragment into sub-fragments consistent with division performed by the other source nodes, and wherein generating the messages comprises:

generating a first message that includes the fragment identifier, a first sub-fragment identifier, and a first sub-fragment of the sub-fragments; and generating a second message that includes the fragment identifier, a second sub-fragment identifier, and a second sub-fragment of the sub-fragments.

19. The device of claim 17, wherein the autonomous decision is further based on group addresses of the other peers in the peer-to-peer network that reside on a same physical network segment as the first peer.

20. The device of claim 17, wherein obtaining the group address comprises autonomously deriving the group address based on an autonomously generated cryptographic key.

21. The device of claim 17, the operations further comprising:

receiving a media fragment of the media stream, wherein dividing the media stream comprises dividing the media fragment into sub-fragments.

22. The device of claim 17, wherein posting the messages to the peer-to-peer network comprises suppressing propagation of the duplicative messages.

23. The device of claim 17, wherein making the determination further comprises determining that the designated point is equidistant from (a) the group address obtained by the first peer and (b) any group addresses obtained by the other peers in the peer-to-peer network.

* * * * *